United States Patent
Gunugunuri et al.

(10) Patent No.: US 11,541,373 B2
(45) Date of Patent: Jan. 3, 2023

(54) MIXED OXIDE CATALYST FOR OXYGEN STORAGE APPLICATIONS AND A METHOD FOR MAKING THE CATALYST

(71) Applicant: Toyota Motor Engineering and Manufacturing North America, Inc., Erlanger, KY (US)

(72) Inventors: Krishna Gunugunuri, Canton, MI (US); Charles A. Roberts, Farmington Hills, MI (US); Torin C. Peck, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 262 days.

(21) Appl. No.: 16/688,677

(22) Filed: Nov. 19, 2019

(65) Prior Publication Data
US 2021/0146338 A1   May 20, 2021

(51) Int. Cl.
| | | |
|---|---|---|
| *B01J 23/00* | (2006.01) | |
| *B01J 21/06* | (2006.01) | |
| *B01D 53/94* | (2006.01) | |
| *B01J 21/04* | (2006.01) | |
| *B01J 23/10* | (2006.01) | |
| *B01J 37/03* | (2006.01) | |

(52) U.S. Cl.
CPC .......... *B01J 23/002* (2013.01); *B01D 53/945* (2013.01); *B01J 21/04* (2013.01); *B01J 21/066* (2013.01); *B01J 23/10* (2013.01); *B01J 37/031* (2013.01)

(58) Field of Classification Search
CPC ........ B01J 23/002; B01J 21/04; B01J 21/066; B01J 23/10; B01J 37/031; B01J 2523/00; B01J 35/002; B01D 53/945; B01D 53/94; B01D 2255/2027; B01D 2255/407; B01D 2255/908
See application file for complete search history.

(56) References Cited

U.S. PATENT DOCUMENTS

| | | |
|---|---|---|
| 5,883,037 A | 3/1999 | Chopin et al. |
| 6,214,306 B1 | 4/2001 | Aubert et al. |
| 6,306,794 B1 | 10/2001 | Suzuki et al. |

(Continued)

FOREIGN PATENT DOCUMENTS

| | | | |
|---|---|---|---|
| EP | 2611535 A1 | 7/2013 | |
| WO | 2012029050 A1 | 3/2012 | |
| WO | WO-2019163435 A1 * | 8/2019 | ............. B01J 23/63 |

OTHER PUBLICATIONS

C.S. Wright et al., "One-Step Hydrothermal Synthesis of Nanocrystalline Ceria-Zirconia Mixed Oxides: The Beneficial Effect of Sodium Inclusion on Redox Properties", Advanced Materials, vol. 19 issue 24, Dec. 11, 2007, p. 4500-4504.

(Continued)

*Primary Examiner* — Anthony J Zimmer
(74) *Attorney, Agent, or Firm* — Jordan IP Law, LLC

(57) ABSTRACT

Catalyst material composed of a sodium incorporated cerium-zirconium based mixed oxide catalyst material, such as Ce—Zr/Al$_2$O$_3$, for oxygen storage capacity applications. The sodium incorporated cerium-zirconium based mixed oxide catalyst material is synthesized by co-precipitation techniques using sodium carbonate as the precipitating agent and exhibits a high oxygen storage capacity.

11 Claims, 1 Drawing Sheet

(56) References Cited

U.S. PATENT DOCUMENTS

| | | |
|---|---|---|
| 7,485,599 B2 | 2/2009 | Muhammed et al. |
| 7,767,617 B2 | 8/2010 | Larcher et al. |
| 7,939,041 B2 | 5/2011 | Darab |
| 10,232,348 B2 | 3/2019 | Wu et al. |
| 2010/0204525 A1* | 8/2010 | Noronha ............... B01J 37/031 568/840 |
| 2013/0108530 A1 | 5/2013 | Chang et al. |
| 2018/0169624 A1 | 6/2018 | Chandler et al. |
| 2020/0353447 A1* | 11/2020 | Hara .................... B01J 37/0215 |
| 2020/0360901 A1* | 11/2020 | Onuki .................... B01J 23/10 |

OTHER PUBLICATIONS

R. Di Monte et al., "Stabilisation of nanostructured $Ce_{0.2}Zr_{0.8}O_2$ solid solution by impregnation on $Al_2O_3$: a suitable method for the production of thermally stable oxygen storage/release promoters for three-way catalysts", Chemical Communications, Nov. 2000, 167-2168, 21(21):2.

B. Reddy et al., "Influence of Alumina, Silica, and Titania Supports on the Structure and CO oxidation Activity of $Ce_xZr_{1-x}O_2$ Nanocomposite Oxides", J. Phys. Chem. C2007, 111, 10478-10483.

Y. Goto et al., "Enhanced oxygen storage capacity of cation-ordered cerium-zirconium oxide induces by titanium substitution", Che. Commun., 2018, 54, 3528.

* cited by examiner

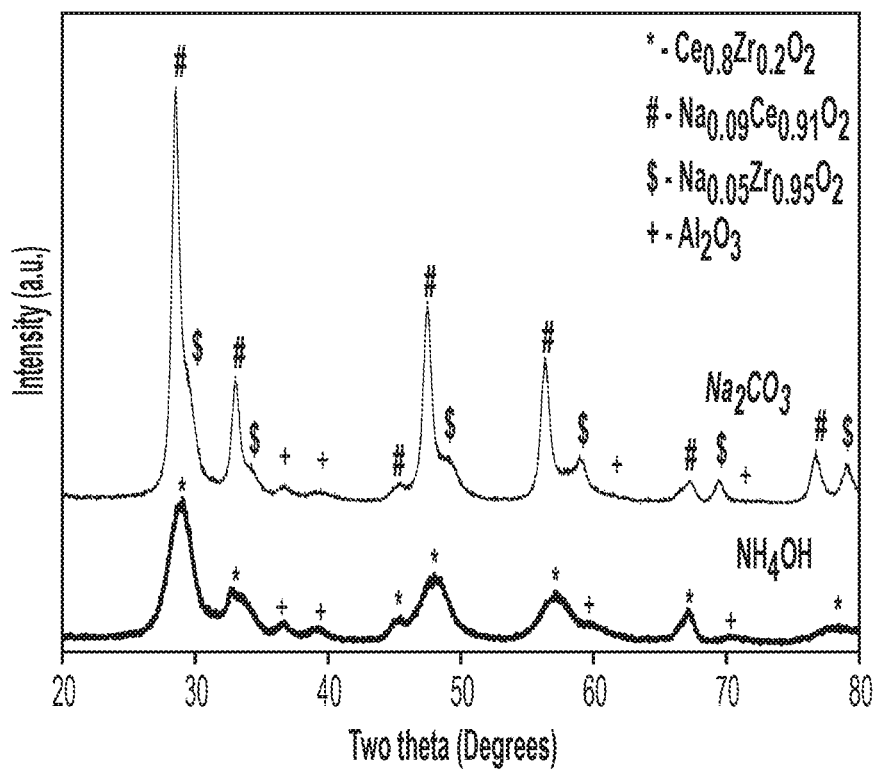

MIXED OXIDE CATALYST FOR OXYGEN STORAGE APPLICATIONS AND A METHOD FOR MAKING THE CATALYST

TECHNICAL FIELD

The present disclosure generally relates to a sodium incorporated cerium-zirconium based mixed oxide catalyst material, such as Ce—Zr/Al$_2$O$_3$, for oxygen storage applications, a method of making the catalyst material and a method of using the catalyst material.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Some metal oxides can reversibly store/release oxygen or control the oxygen concentration in the gas phase in response to changes in the temperature and oxygen partial pressure. Ceria (CeO$_2$) is generally used as an oxygen storage material in automotive exhaust catalysis in order to maintain the high purification efficiency by precisely controlling the oxygen partial pressure. Cerium-zirconium composite oxides are widely used as oxygen storage components due to their oxygen storage/release property and good hydrothermal stability. The oxygen storage/release capacity (OSC) of CeO$_2$ corresponding to the redox reaction between Ce$^{3+}$ and Ce$^{4+}$ is greatly enhanced by Zr substitution, reaching its maximum for Ce$_{0.5}$Zr$_{0.5}$O$_2$.

Composite oxides of cerium-zirconia with additional elements have been studied for improved performance properties. Incorporation of alumina into cerium-zirconium oxides reportedly has been shown to improve thermal resistance and oxygen storage/release property of the materials. A pyrochlore Pd/k-Ce$_2$Zr$_2$O$_8$ PCP material having good oxygen storage capacity was developed for oxygen storage/release applications.

Further improvements are still desired for ceria-zirconia-alumina composite oxides.

SUMMARY

This section provides a general summary of the disclosure and is not a comprehensive disclosure of its full scope or all of its features.

The present inventors have developed a sodium incorporated cerium-zirconium based mixed oxide catalyst material having enhanced oxygen storage capacity (OSC). In one aspect, the cerium-zirconium based mixed oxide has the general formula: Na$_x$Ce$_{1-x}$—Na$_y$Zr$_{1-y}$O$_7$, wherein x is 0.01 to 0.3; and y is 0.01 to 0.3. In another embodiment, the sodium incorporated cerium-zirconium based mixed oxide catalyst material has the following formula:

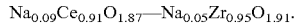

In another aspect, the catalyst material further comprises a support, which may be selected from the group consisting of Al$_2$O$_3$, SiO$_2$, and TiO$_2$. In one embodiment, the support is Al$_2$O$_3$, forming a sodium incorporated Ce—Zr/Al$_2$O$_3$ catalyst material. In another embodiment, the support is Al$_2$O$_3$, and the sodium incorporated cerium-zirconium based mixed oxide catalyst material has the formula: Na$_{0.09}$Ce$_{0.91}$O$_{1.87}$—Na$_{0.05}$Zr$_{0.95}$O$_{1.91}$/Al$_2$O$_3$. In another embodiment, the support is Al$_2$O$_3$ stabilized with lanthanum (La). In another aspect, the sodium incorporated cerium-zirconium based mixed oxide catalyst is synthesized by a co-precipitation method using Na$_2$CO$_3$ as the precipitating agent. In one embodiment, the sodium incorporated cerium-zirconium based mixed oxide catalyst synthesized by a co-precipitation method employing sodium carbonate (Na$_2$CO$_3$) as the precipitating agent has enhanced oxygen storage capacity. In one aspect, the sodium incorporated cerium-zirconium based mixed oxide catalyst synthesized by a co-precipitation method employing sodium carbonate (Na$_2$CO$_3$) as the precipitating agent has the general formula: Na$_x$Ce$_{1-x}$—Na$_y$Zr$_{1-y}$O$_2$, wherein x is 0.01 to 0.3; and y is 0.01 to 0.3.

In another aspect, the sodium incorporated cerium-zirconium based mixed oxide catalyst synthesized by a co-precipitation method employing sodium carbonate (Na$_2$CO$_3$) as the precipitating agent further comprises a support, which may be selected from the group consisting of Al$_2$O$_3$, SiO$_2$, and TiO$_2$. In one embodiment, the support is Al$_2$O$_3$, forming a sodium incorporated Ce—Zr/Al$_2$O$_3$ catalyst material. In another embodiment, the support is Al$_2$O$_3$, and the sodium incorporated cerium-zirconium based mixed oxide catalyst material has the formula: Na$_{0.09}$Ce$_{0.91}$O$_{1.87}$—Na$_{0.05}$Zr$_{0.95}$O$_{1.91}$/Al$_2$O$_3$. In another embodiment, the support is Al$_2$O$_3$ stabilized with lanthanum.

In another aspect, the sodium incorporated cerium-zirconium based mixed oxide catalyst material synthesized by a co-precipitation method using Na$_2$CO$_3$ as the precipitating agent exhibits high oxygen storage capacity (OSC) compared to a prior art Pd/k-Ce$_2$Zr$_2$O$_8$ PCP material during transient thermal oxygen storage study.

In another aspect the sodium incorporated cerium-zirconium based mixed oxide catalyst material synthesized by a co-precipitation method using Na$_2$CO$_3$ as the precipitating agent exhibits better oxygen storage capacity (OSC) compared to CeO$_2$—ZrO$_2$/Al$_2$O$_3$ synthesized by a co-precipitation using conventional ammonium hydroxide as the precipitating agent. In another aspect, there is disclosed a method of treating an exhaust gas from an internal combustion engine comprising contacting the exhaust gas with a sodium incorporated cerium-zirconium based mixed oxide catalyst material obtained by a deposition co-precipitation method employing Na$_2$CO$_3$ as the precipitating agent.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein:

The FIGURE is a plot of X-ray diffraction profiles of the CeO$_2$—ZrO$_2$/Al$_2$O$_3$ materials synthesized by co-precipitation using NH$_4$OH and Na$_2$CO$_3$ precipitating agents.

It should be noted that the FIGURES set forth herein are intended to exemplify the general characteristics of the methods, algorithms, and devices among those of the present technology, for the purpose of the description of certain aspects. These FIGURES may not precisely reflect the characteristics of any given aspect and are not necessarily intended to define or limit specific embodiments within the scope of this technology. Further, certain aspects may incorporate features from a combination of FIGURES.

DESCRIPTION

The present teachings provide a sodium incorporated cerium-zirconium based mixed oxide catalyst material having enhanced oxygen storage capacity (OSC). In one aspect, sodium incorporated cerium-zirconium based mixed oxide catalyst materials are disclosed for oxygen storage capacity applications, including both close coupled and under floor exhaust after treatment applications, which exhibit high oxygen storage capacity.

In another aspect, the cerium-zirconium based mixed oxide has the general formula: $Na_xCe_{1-x}$—$Na_yZr_{1-y}O_2$, wherein x is 0.01 to 0.3; and y is 0.01 to 0.3. In one embodiment, x is 0.09 and y is 0.05. In another embodiment, the sodium incorporated cerium-zirconium based mixed oxide catalyst material has the following formula: $Na_{0.09}Ce_{0.91}O_{1.87}$—$Na_{0.05}Zr_{0.95}O_{1.91}$.

In another aspect, the catalyst material further comprises a support, which may be selected from the group consisting of $Al_2O_3$, $SiO_2$, and $TiO_2$. In one embodiment, the support is $Al_2O_3$, forming a sodium incorporated Ce—Zr/$Al_2O_3$ catalyst material. In another embodiment, the support is $Al_2O_3$, and the sodium incorporated cerium-zirconium based mixed oxide catalyst material has the formula: $Na_{0.09}Ce_{0.91}O_{1.87}$—$Na_{0.05}Zr_{0.95}O_{1.91}$/$Al_2O_3$. In another embodiment, the support is $Al_2O_3$ stabilized with lanthanum. The support may be stabilized with lanthanum, such as a La stabilized $Al_2O_3$ support containing 2 to 5% lanthanum. The molar ratio of $Ce_{0.5}Zr_{0.5}O_2$ to La stabilized may be in the range of 1:0.5 to 1:10. In one embodiment the molar ratio of $Ce_{0.5}Zr_{0.5}O_2$ to La stabilized $Al_2O_3$ is 1:1.

In another aspect, the sodium incorporated cerium-zirconium based mixed oxide catalyst is synthesized by a co-precipitation method using $Na_2CO_3$ as the precipitating agent. For example, the required amounts of the precursor metal nitrates may be dissolved separately in water and mixed together. The required amount of the support material, such as $Al_2O_3$, may be dispersed in water and mixed with the metal nitrate solutions. The precipitating agent, such as $Na_2CO_3$, may be separately dissolved in water and the resulting precipitating agent solution slowly added and stirred until the desired pH is reached to drive precipitation of the mixed metal oxides. The precipitate may be dried, ground into a powder, and then calcined. Calcining may be at a temperature of from about 500-1000° C. for about 1 to 50 hrs. at a ramp rate of about 1 to 20° C./min. In one embodiment, the catalyst is calcined at 600° C. for 3 hrs at a ramp rate of about 2° C./min.

In one embodiment, the sodium incorporated cerium-zirconium based mixed oxide catalyst synthesized by a co-precipitation method employing sodium carbonate ($Na_2CO_3$) as the precipitating agent has enhanced oxygen storage capacity.

In another embodiment, the sodium incorporated cerium-zirconium based mixed oxide catalyst synthesized by a co-precipitation method employing sodium carbonate ($Na_2CO_3$) as the precipitating agent exhibits 1.5 times greater oxygen storage capacity (OSC) compared to a prior art Pd/k-$Ce_2Zr_2O_8$PCP material during transient thermal oxygen storage study. In another embodiment, the sodium incorporated cerium-zirconium based mixed oxide catalyst material exhibiting 1.5 times greater oxygen storage capacity (OSC) compared to a prior art Pd/k-$Ce_2Zr_2O_8$ PCP material has the general formula: $Na_xCe_{1-x}$—$Na_yZr_{1-y}O_2$, wherein x is 0.01 to 0.3; and y is 0.01 to 0.3. In another embodiment, the sodium incorporated cerium-zirconium based mixed oxide catalyst exhibiting 1.5 times greater oxygen storage capacity (OSC) compared to a prior art Pd/k-$Ce_2Zr_2O_8$ PCP has the following formula: $Na_{0.09}Ce_{0.91}O_{1.87}$—$Na_{0.05}Zr_{0.95}O_{1.91}$.

In another embodiment, the sodium incorporated cerium-zirconium based mixed oxide catalyst material exhibiting 1.5 times greater oxygen storage capacity (OSC) compared to a prior art Pd/k-$Ce_2Zr_2O_8$PCP material further comprises a support, which may be selected from the group consisting of $Al_2O_3$, $SiO_2$, and $TiO_2$. In one embodiment, the support is $Al_2O_3$, forming a sodium incorporated Ce—Zr/$Al_2O_3$ catalyst material. In another embodiment, the support is $Al_2O_3$, and the sodium incorporated cerium-zirconium based mixed oxide catalyst material has the formula: $Na_{0.09}Ce_{0.91}O_{1.87}$—$Na_{0.05}Zr_{0.95}O_{1.91}$/$Al_2O_3$. In another embodiment, the support is $Al_2O_3$ stabilized with lanthanum.

In another embodiment, the sodium incorporated cerium-zirconium based mixed oxide catalyst synthesized by a co-precipitation method employing sodium carbonate ($Na_2CO_3$) as the precipitating agent exhibits better oxygen storage capacity (OSC) compared to $CeO_2$—$ZrO_2$/$Al_2O_3$ synthesized by a co-precipitation using conventional ammonium hydroxide as the precipitating agent. In one embodiment, the cerium-zirconium based mixed oxide synthesized by a co-precipitation method employing sodium carbonate ($Na_2CO_3$) which exhibits better oxygen storage capacity (OSC) compared to $CeO_2$—$ZrO_2$/$Al_2O_3$ synthesized by a co-precipitation using conventional ammonium hydroxide has the general formula: $Na_xCe_{1-x}$—$Na_yZr_{1-y}O_2$, wherein x is 0.01 to 0.3; and y is 0.01 to 0.3. In another embodiment, the sodium incorporated cerium-zirconium based mixed oxide catalyst synthesized by a co-precipitation method employing sodium carbonate ($Na_2CO_3$) as the precipitating agent has the following formula:

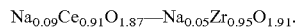

$$Na_{0.09}Ce_{0.91}O_{1.87}\text{—}Na_{0.05}Zr_{0.95}O_{1.91}.$$

In another embodiment, the cerium-zirconium based mixed oxide synthesized by a co-precipitation method employing sodium carbonate ($Na_2CO_3$) which exhibits better oxygen storage capacity (OSC) compared to $CeO_2$—$ZrO_2$/$Al_2O_3$ synthesized by a co-precipitation using conventional ammonium hydroxide further comprises a support, which may be selected from the group consisting of $Al_2O_3$, $SiO_2$, and $TiO_2$. In one embodiment, the support is $Al_2O_3$, forming a sodium incorporated Ce—Zr/$Al_2O_3$ catalyst material. In another embodiment, the support is $Al_2O_3$, and the sodium incorporated cerium-zirconium based mixed oxide catalyst material has the formula: $Na_{0.09}Ce_{0.91}O_{1.87}$—$Na_{0.05}Zr_{0.95}O_{1.91}$/$Al_2O_3$. In another embodiment, the support is $Al_2O_3$ stabilized with lanthanum.

In another embodiment, there is disclosed a method of treating an exhaust gas from an internal combustion engine comprising contacting the exhaust gas with a sodium incorporated cerium-zirconium based mixed oxide catalyst material, obtained by a deposition co-precipitation method employing $Na_2CO_3$ as the precipitating agent. In one embodiment the cerium-zirconium based mixed oxide has the general formula: $Na_xCe_{1-x}$—$Na_yZr_{1-y}O_2$, wherein x is 0.01 to 0.3; and y is 0.01 to 0.3. In another embodiment, the sodium incorporated cerium-zirconium based mixed oxide catalyst material has the following formula: $Na_{0.09}Ce_{0.91}O_{1.87}$—$Na_{0.05}Zr_{0.95}O_{1.91}$. In another embodiment, the catalyst material further comprises a support, which may be selected from the group consisting of $Al_2O_3$, $SiO_2$, and $TiO_2$. In one embodiment, the support is $Al_2O_3$, forming a sodium incorporated Ce—Zr/$Al_2O_3$ catalyst material. In another embodiment, the support is $Al_2O_3$, and the sodium incorporated cerium-zirconium based mixed oxide catalyst material has the formula: $Na_{0.09}Ce_{0.91}O_{1.87}$—$Na_{0.05}Zr_{0.95}O_{1.91}$/$Al_2O_3$. In another embodiment, the support is $Al_2O_3$ stabilized with lanthanum.

Examples

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis and Material Characterization

Sodium incorporated cerium-zirconium based mixed oxide catalysts, such as $Ce_{0.5}Zr_{0.5}O_2$/$Al_2O_3$ catalysts, were synthesized by using a deposition—co-precipitation method using $Na_2CO_3$ as the precipitating agent. In a typical synthesis procedure, the required amounts of $Ce(NO_3)_3$ and $ZrO(NO_3)_2$ were dissolved separately in deionized water and mixed together. On the other hand, the required amount of La stabilized $Al_2O_3$ (containing 2 to 5% lanthanum) was dispersed in 200 ml of water and mixed with Ce, Zr nitrate solutions (molar ratio of $Ce_{0.5}Zr_{0.5}O_7$ to La stabilized $Al_2O_3$ is 1:1). Then the $Na_2CO_3$ solution was slowly added to the mixed solution dropwise. The pH of the solution was constantly monitored as the precipitating agent solution was added. The reactants were constantly stirred using a magnetic stirrer until a pH level of 9-10 was reached. The supernatant liquid was then decanted and filtered to obtain the precipitate. The precipitate was dried overnight at 120° C. The acquired substance was then grinded into a fine powder. Finally, the catalyst calcined at 600° C. (2° C./min ramp rate) for 3 hours.

For reference $Ce_{0.5}Zr_{0.5}O_2$/$Al_2O_3$ catalysts were also synthesized by using deposition—co-precipitation method using conventional ammonium hydroxide as the precipitating agent.

X-ray powder diffraction (XRD) patterns were obtained using Rigaku SmartLab X-ray diffractometer using Cu Kα radiation (¼ 1.5405 A). A glass holder was used to support the sample. The scanning range was from 10 to 80 (2θ) with a step size of 0.02 and a step time of 1 s. The XRD phases present in the samples were identified with the help of ICDD-JCPDS data files.

Performance Evaluation

The oxygen storage capacity (OSC) experiments were performed in TA Q550 thermal gravimetric analyzer. Prior to storage, the material was pretreated to 700° C. in the presence of nitrogen to remove the adsorbed impurities. After the pretreatment, the temperature is decreased to 100° C. in the presence of air to reabsorb only oxygen. The air flow was continued for one more hour at 100° C. to make sure that all the oxygen vacancies were filled with oxygen. Then the temperature was increased to 700° C. in the presence of nitrogen and weight loss was measured to calculate the oxygen storage capacity of the samples. The process was repeated for one more cycle.

Oxygen storage capacity values of $CeO_2$—$ZrO_2$/$Al_2O_3$ material synthesized by a co-precipitation method using $NH_4OH$ and $Na_2CO_3$ precipitating agents are presented in Table 1. As shown in Table 1, the $CeO_2$—$ZrO_2$/$Al_2O_3$ material synthesized using sodium carbonate as the precipitating agent exhibits much higher oxygen storage capacity compared to the material synthesized using $NH_4OH$ as the precipitating agent. The $CeO_2$—$ZrO_2$/$Al_2O_3$ material synthesized using sodium carbonate as the precipitating agent also exhibits 1.5 times higher oxygen storage capacity compared to the prior art Pd/k-$Ce_2Zr_2O_8$ PCP material.

TABLE 1

Oxygen storage capacity values of $CeO_2$—$ZrO_2$/$Al_2O_3$ catalysts synthesized using $Na_2CO_3$ and $NH_4OH$ precipitating agents, and prior art Pd/k-$Ce_2Zr_2O_8$ PCP material.

| Catalyst | Oxygen Storage Capacity (µmol/g) |
| --- | --- |
| $Na_{0.09}Ce_{0.91}O_{1.87}$—$Na_{0.05}Zr_{0.95}O_{1.91}$/$Al_2O_3$ ($Na_2CO_3$) | 791 |
| $Ce_{0.8}Zr_{0.2}O_2$/$Al_2O_3$ ($NH_4OH$) | 600 |
| Pd/k-$Ce_2Zr_2O_8$ PCP | 520 |

The X-ray diffraction profiles of the materials synthesized by $NH_4OH$ and $Na_2CO_3$ precipitating agents are presented in the FIGURE. As expected, $CeO_2$—$ZrO_2$/$Al_2O_3$ material synthesized by the $NH_4OH$ precipitating agent exhibits reflections due to $Ce_{0.8}Zr_{0.2}O_2$ (JCPDS: 01-080-6313) and $Al_2O_3$ (00-047-1771). On the other hand, $CeO_2$—$ZrO_2$/$Al_2O_3$ material synthesized by the $Na_2CO_3$ precipitating agent exhibits completely different reflections. The material exhibits reflections due to oxygen deficient $Na_{0.09}Ce_{0.91}O_{1.87}$ (JCPDS: 04-015-024) and $Na_{0.05}Zr_{0.95}O_{1.92}$ (JCPDs: 04-011-5936) along with the $Al_2O_3$ reflections. These measurements indicate that the $CeO_2$—$ZrO_2$/$Al_2O_3$ material synthesized by the $Na_2CO_3$ precipitating agent yields a different oxygen deficient phase compared to the conventional $NH_4OH$ and responsible for the better oxygen storage capacity.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the term "about", in the context of concentrations of components of the formulations, typically means+/−5% of the stated value, more typically+/−4% of the stated value, more typically+/−3% of the stated value, more typically, +/−2% of the stated value, even more typically+/−1% of the stated value, and even more, typically 41-0.5% of the stated value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sodium incorporated cerium-zirconium based mixed oxide catalyst material for oxygen storage applications having, the general formula: $Na_xCe_{1-x}$—$Na_yZr_{1-y}O_2$, wherein x is 0.01 to 0.3, and y is 0.01 to 0.3,
   wherein the catalyst material is synthesized by deposition co-precipitation employing sodium carbonate as the precipitating agent to obtain a mixed metal oxide precipitate.

2. The catalyst material according to claim 1, wherein x is 0.09 and y is 0.05.

3. The catalyst material according to claim 1, which further comprises a support.

4. The catalyst material according to claim 3, wherein the support is selected from the group consisting of $Al_2O_3$, $SiO_2$, and $TiO_2$.

5. The catalyst material according to claim 4, wherein the support is $Al_2O_3$.

6. The catalyst material according to claim 5, wherein the support is $Al_2O_3$ stabilized with lanthanum.

7. A sodium incorporated cerium-zirconium based mixed oxide catalyst material for oxygen storage applications, wherein the cerium-zirconium based mixed oxide has the formula: $Na_{0.09}Ce_{0.91}O_{1.87}$—$Na_{0.05}Zr_{0.95}O_{1.91}$, and is synthesized by deposition co-precipitation employing sodium carbonate as the precipitating agent to obtain a mixed metal oxide precipitate.

8. The catalyst material according to claim 7, which further comprises a support.

9. The catalyst material according to claim 8, wherein the support is selected from the group consisting of $Al_2O_3$, $SiO_2$, and $TiO_2$.

10. The catalyst material according to claim 9, wherein the support is $Al_2O_3$.

11. The catalyst material according to claim 10, wherein the support is $Al_2O_3$ stabilized with lanthanum.

* * * * *